United States Patent [19]

Kuhlmann

[11] 4,407,615

[45] Oct. 4, 1983

[54] TOOL-CLAMPING DEVICE

[75] Inventor: Gerhard Kuhlmann, Stuttgart, Fed. Rep. of Germany

[73] Assignee: Robert Bosch GmbH, Stuttgart, Fed. Rep. of Germany

[21] Appl. No.: 199,107

[22] Filed: Oct. 20, 1980

[30] Foreign Application Priority Data

Oct. 27, 1979 [DE] Fed. Rep. of Germany ....... 2943500

[51] Int. Cl.³ ........................ B23B 31/08; B23B 45/00

[52] U.S. Cl. ............................ 408/239 A; 279/1 ME; 279/8; 279/19.2; 279/33; 409/234

[58] Field of Search ............... 409/230, 231, 232, 233, 409/234; 408/126, 239, 239 A; 279/1 E, 1 ME, 1 TS, 9, 19.1, 19.2, 33, 8

[56] References Cited

U.S. PATENT DOCUMENTS 1,503,932 8/1924 Wilhelm et al. .................. 279/19.1
3,161,242 12/1964 Etzkorn et al. .................. 279/19.1
3,984,192 10/1976 Wanner et al. .................. 279/62 X
4,171,821 10/1979 Miller ................................ 279/1 B
4,176,991 12/1979 Egli .................................. 279/33 X

FOREIGN PATENT DOCUMENTS 233355 5/1964 Austria ................................ 279/62

*Primary Examiner*—Z. R. Bilinsky
*Attorney, Agent, or Firm*—Michael J. Striker

[57] ABSTRACT

A tool-clamping device for a hand tool machine with a rotary drive spindle includes a tool-clamping set having an outer sleeve mounted on an inner sleeve which serves to clamp a tool to be used and a locking plate which is pivotal relatively to a housing of the tool machine to lock the outer sleeve when the latter is adjusted on the spindle to a predetermined position in an axial direction or to release the outer sleeve for enabling an operator to quickly change a tool to be used in the hand tool machine.

8 Claims, 3 Drawing Figures

TOOL-CLAMPING DEVICE

BACKGROUND OF THE INVENTION

The present invention relates to tool machines such as hand drills and more particularly to tool-clamping devices.

It is known in the art that a tool is clamped in a tool machine by means of a tool chuck. A tool may be also inserted into a tool-receiving sleeve mounted in a tool machine which sleeve is normally connected to a drive in a form-locking connection for synchronized rotation. In each case a special tool-receiving element is provided for different types of tool machines. The tools (drills) having a specially formed shaft portion to be inserted into a bore in a tool-receiving sleeve can not be utilized with tool chucks and the tools (drills) having normal cylindrical shafts to be clamped within a chuck cannot be used in machine tools with tool-receiving sleeves.

SUMMARY OF THE INVENTION

It is an object of this invention to provide a tool-clamping device which avoids by simple means the aforementioned drawbacks encountered in the prior art.

Another object of the invention is to provide an improved tool-clamping device which may be easily adapted to different conditions of use.

Still another object of the invention is to provide a tool-clamping device which may be utilized in drilling, milling, threading machines and the like.

Yet another object of the invention is to provide an improved tool-clamping device capable for use with different tools to be utilized in one hand tool machine.

These and other objects are attained by a tool clamping device for a tool machine having a housing and a tool drive with a rotary drive spindle, which device comprises tool-receiving means adapted to clamp a tool to be used, said tool-receiving means being formed so as to be selectively coupled with said drive spindle to permit relatively quick change of a tool to be used without utilization of a chuck.

The tool-receiving means may be arranged to be moved relatively to said drive spindle in an axial direction.

The device may further comprise locking means adapted to be selectively positioned between a locking position to limit said axial movement of said tool-receiving means and a released position to release said tool-receiving means to thereby permit relatively quick change of a tool to be used.

The tool-clamping device may further include a handle mounted on the housing, said handle carrying the locking means.

The locking means may include a locking plate and an axle mounted on said housing, said locking plate being arranged to pivot about said axle between the locking and releasing positions.

The locking plate may have a gripping flange.

The tool-clamping device may further include a spring mounted on said axle to bias said locking plate in said locking position.

The tool-receiving means may include an outer sleeve having radially outwardly extended flanges and an inner sleeve threadably positioned within the outer sleeve and having a first end portion extending into a recess provided in the spindle, a second end portion adapted to receive a tool to be used, and a shaped intermediate portion.

The device may further comprise an adapter threadably mounted on the spindle and having a nut portion with a shaped internal surface corresponding to said shaped intermediate portion, said nut portion being adapted to receive said intermediate portion for axial movement therethrough.

The gripping flange of said locking plate may be arranged to engage the radially outwardly extended flanges of the outer sleeve for limiting the axial movement of the tool-receiving means.

The outer sleeve may be axially extended so that it overlaps the adapter to thereby prevent the spindle from pollution.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
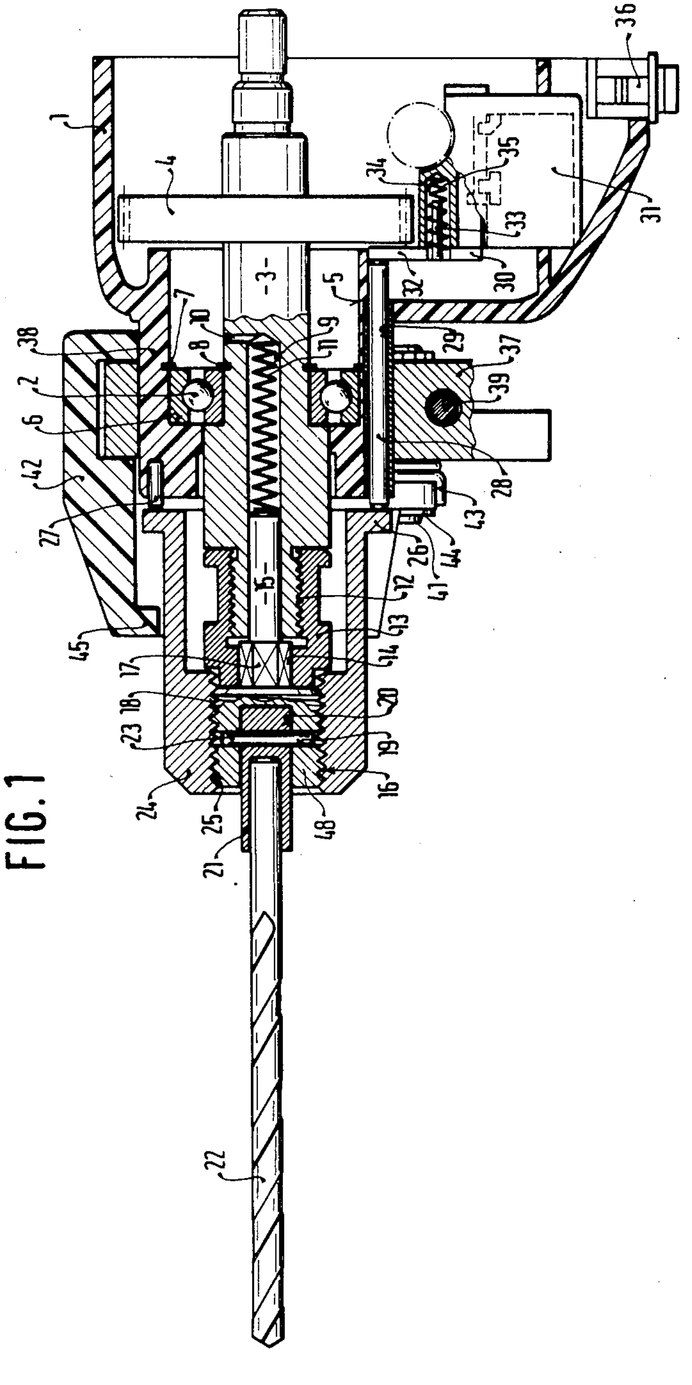
FIG. 1 is an axial sectional view through a tool machine with a tool-clamping device according to the invention.

Referring to the drawings, and particularly to FIG. 1, a housing or front cap 1 of a drilling machine is illustrated. The part of the hand-operated machine at the right side of the cap 1 is not shown herein. The front cap 1 surrounds a drive spindle 3 carrying a pinion 4 at one end thereof and supported within a ball bearing 2. The ball bearing is mounted in a bore 5 provided in the front cap 1 and is axially secured in the cap from a slidable movement in a section 6 of the bore 5 by means of the corresponding step made in the spindle 3 at one side of the bearing, and by means of keys 7 and 8 arranged at the other side of the bearing. The drive spindle 3 is formed with an internal axial bore 9 which is vented by a radial opening 10 formed at the end thereof. A helical spring 11 is inserted into the bore 9. The drive spindle 3 has a threaded end portion 12 which is normally adapted to receive a tool chuck. In the embodiment presented herein, an adapter 13 is threadedly mounted on the end portion 12 of the spindle 3. A drill 22 or any other suitable tool is rigidly mounted in a tool shaft 21 which in turn is inserted into a recess 20 formed in a tool-receiving sleeve or trunnion 16. The tool-receiving sleeve 16 is formed with a specially formed intermediate shaft portion 17 which is engaged in a prismatic hole of a nut portion 14 of the adapter 13.

One end portion of the tool-receiving sleeve 16 is formed as a head 48 having an outer thread 18. A radially extending bore 19 also passes through the tool shaft 21 and head 48. A cylindrical pin 23 is inserted into the bore 19 to interconnect the sleeve 16 with the tool shaft 21 and to prevent their rotation one relative to the other. An outer sleeve 24 is threadably mounted on the thread 18 of the sleeve 16 by means of an inner thread 25 provided in the sleeve 24.

Figure 2:
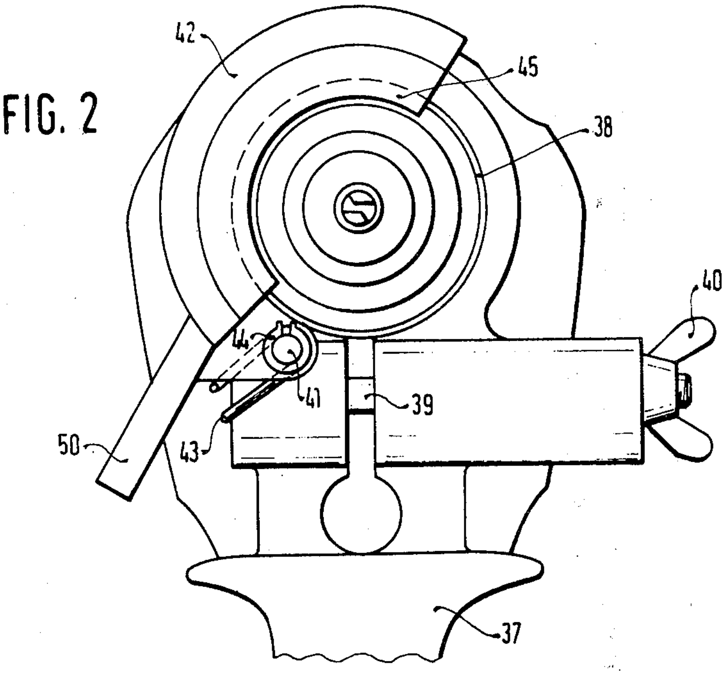
FIG. 2 is a front view of the tool machine, with a portion removed.
Figure 3:
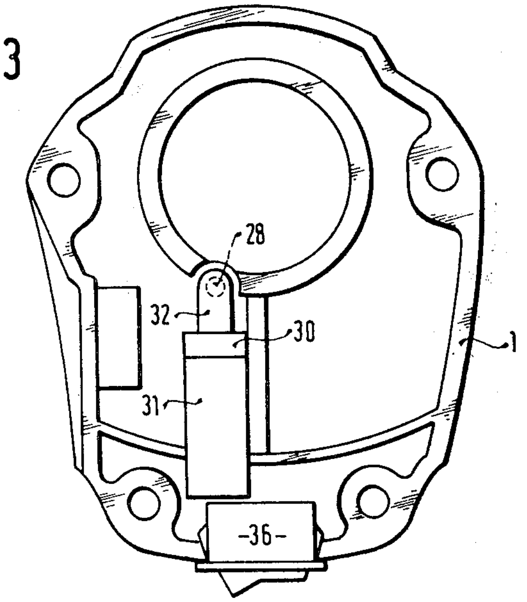
FIG. 3 is a rear view of the tool machine with a tool drive not illustrated.

The thread 25 extends somewhat longer in the lengthwise direction than the length of the tool-receiving sleeve 16 as is clearly seen in FIG. 1. The outer sleeve 24 extends in the axial direction so as to overlap adapter 13 and further extends towards the spindle 3 in order to protect the adapter 13 and the internal part of the spindle from contamination. The sleeve 24 is provided with a flange 26 which is formed at one of head 48 of the ends of the sleeve and is extended outwardly radially from the outer surface of the sleeve. A pin 27 is rigidly mounted in the cap 1 which has a ball-like front surface axially outwardly projected from the end face of the cap. The end face of the flange 26 is arranged at a predetermined distance from the ball-like surface of the pin 27. A longitudinal pin 28 is slidably mounted in the cap 1. The pin 28 is also formed with a ball-like end portion axially outwardly projected from the end face of the cap 1. The end face of the flange 26 bears against the end portion of the longitudinal pin 28 which serves in the arrangement as a transmitter. The pin 28 is guided in an opening 29 formed in the cap 1 and extended parallel to the longitudinal axis of the spindle 3. The pin 28 projects within the interior of the cap 1 and carries at its second end a movable element 30 of a controller 31 which is also shown in FIG. 3. This movable element 30 is adapted to move in the axial direction via the longitudinal pin 28 which is connected to the element 30 by means of a connecting plate 32. As may be clearly seen in FIG. 1, a bearing opening 34 is formed in the cap 1 or in an element rigidly connected to the cap 1 to receive a compression spring 35 and a pin 33 rigidly secured to the element 30. This compression spring 35 constantly tends to slide out from the opening 34 in the direction towards the longitudinal pin 28. The controller 31 is so constructed that it can control loads exerted on the tool drive during the operation in the range from zero to the maximum possible loads. A switch 36 is provided in the arrangement (FIG. 3) to supply an electric current to the tool drive, which switch also serves to supply the current to the controller 31. A gripping handle 37 is mounted on a collar 38 of the cap 1 to which this handle is clamped. A longitudinal bolt 39 with a butterfly nut 40 mounted at the end thereof serves as clamping means to connect the gripping handle 37 to the cap 1 as clearly seen in FIG. 2. The gripping handle 37 is provided with a pin 41 extending parallel to the longitudinal axis of the tool drive. A locking plate 42 encircling the upper portion of the handle 37 is pivotally supported on the pin 41 and may be pivoted about the collar 38 by means of a handle 50. A spring 43 surrounding the pin 41 is arranged between the handle 37 and the locking plate 42. This spring is prestressed so that the locking plate 42 constantly tends to pivot relatively to the collar 38 of the cap 1. A locking ring 44 provided in the assembly ensures the position of the plate 42 and the spring 43 on the pin 41. The locking plate 42 is provided with a radially inwardly projected flange 45. The plate 42 in its turned or pivoted position when it is clamped near the collar 38 and the handle 37 can overlap the sleeve 24. It is to be understood that the flange 45 is placed in the region of axial movement of flange 26 of the outer sleeve 24. Therefore, the pin 27 and the flange 45 in the locking position of the plate 42 limit the maximum axial play of the sleeve 24. After the sleeve 24 has been adjusted on the tool receiving sleeve 16 this maximum play is more or less utilized. When the axial position of the sleeve 24 is selected relatively to the sleeve 16, in other words when the sleeve 16 is so positioned relatively to the adapter 13, the maximum axial play is not completely taken up before the flange 46 reaches the ball-like surface of the pin 27. This means that the front face of the flange 46 of the sleeve 24 is adjacent the pin 28 communicated with the controller 31 at relatively low speed of rotations of the drive spindle 3.

As was mentioned above, various machine tools such as a drill or any other suitable tools may be preliminarily installed into the tool-receiving sleeve 16 of the outer sleeve 24. The sleeve 24 may be moved into such axial position on the sleeve 16 that a standard number of revolutions may be adjusted by means of the pin 28 when the latter is in contact with the front face of the flange 26. In order to change a tool to be used in the arrangement of the foregoing type the locking plate 42 is pivoted against the action of the spring 43 relatively to the collar 38 of the cap 1. When the flange 45 is moved away from the region of axial movement of the flange 26, the tool 22 with the sleeve 24 may be taken out. When the above mentioned movement of the sleeve 24 to its contacting position with pin 28 begins the helical spring 11 biases the end portion 15 of the sleeve 16. In order to insert a new tool (drill or the like) into the sleeve 16 the locking plate 42 must be placed into the corresponding position. The end guiding portion 15 is installed into the bore 9 of the drive spindle 3 and pressed against the action of the helical spring 11 unless the flange 45 of the plate 42 engages the flange 26 of the sleeve 24. The released locking plate 42 pivots by action of the spring 43 into its locking position. At this time a number of revolutions of the tool drive for the installed tool is limited by the control arrangement in the range from zero to the optimum number. The length of coupling between the nut portion 14 of the adapter 13 and the shaft portion 17 of the tool receiving sleeve 16 is so adjusted that when the controller 31 is set up to zero number of revolutions both elements being coupled become to move out of engagement. Independently, such adjustment may be obtained when the tool is released from the sleeve 16 before the controller 31 reaches its zero position. This may be attained by means of selection of the respective length of the shaft portion 17 which may be different for each individual tool.

It will be understood that each of the elements described above, or two or more together, may also find a useful application in other types of constructions differing from the types described above.

While the invention has been illustrated and described as embodied in a tool-clamping device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A tool clamping device for a tool machine, particularly for use in hand tool machines having a housing, and a tool drive with a rotary drive spindle, comprising tool-receiving means adapted to clamp a tool to be used, said tool-receiving means being arranged so as to be moved relative to said drive spindle in an axial direction and to be selectively coupled with said drive spindle to permit relatively quick change of a tool to be used without utilization of a chuck; and locking means adapted to be selectively positioned between a locking position to limit the axial movement of said tool-receiving means and a released position to release said tool-receiving means to thereby permit relatively quick change of a tool to be used, said locking means including a locking plate and an axle mounted on said housing, said locking plate being arranged to pivot about said axle between said locking and released positions, said spindle being provided with a longitudinal recess, and said tool-receiving means including an outer sleeve having a radially outwardly extended flange and an inner sleeve threadably positioned within said outer sleeve and having a first end portion extending into said recess, a second end portion adapted to receive a tool to be used and a shaped intermediate portion.

2. The device of claim 1, further including a handle mounted on said housing, said handle carrying said locking means.

3. The device of claim 2, wherein said locking plate has a gripping flange.

4. The device of claim 3, further including a spring mounted on said axle to bias said locking plate in said locking position.

5. The device of claim 4, further comprising an adapter threadably mounted on said spindle and having a nut portion with a shaped internal surface corresponding to said shaped intermediate portion, said nut portion being adapted to receive said intermediate portion for axial movement therethrough.

6. The device of claim 5, wherein said gripping flange of said locking plate is arranged to engage said radially outwardly extended flange of said outer sleeve for limiting said axial movement of said tool-receiving means.

7. The device of claim 6, wherein said outer sleeve is axially extended so that it overlaps said adapter to thereby prevent said spindle from pollution.

8. The device of claim 1, further including means provided on the drive spindle and receiving said tool-receiving means and permitting the utilization of a chuck when said tool-receiving means are uncoupled from said drive spindle.

* * * * *